United States Patent
Hart et al.

[11] 3,913,412
[45] Oct. 21, 1975

[54] DRIVE COUPLING

[75] Inventors: John E. Hart, Dayton; William H. Penn, Jr., Lebanon; John J. Tuss, Englewood, all of Ohio

[73] Assignee: The Bendix Corporation, Southfield, Mich.

[22] Filed: Nov. 25, 1974

[21] Appl. No.: 526,777

[52] U.S. Cl............................................ 74/424.8 R
[51] Int. Cl.²........................................... F16H 1/18
[58] Field of Search........................... 74/424.8, 459

[56] References Cited
UNITED STATES PATENTS
3,533,298  10/1970  Gerber.......................... 74/424.8 R

*Primary Examiner*—Leonard H. Gerin
*Attorney, Agent, or Firm*—John R. Benefiel

[57] ABSTRACT

A drive coupling is disclosed coupling a ball screw drive mechanism to a driven carriage so as to maintain precisely the position of the carriage with respect to the ball screw in directions along which the carriage moves while allowing lateral relative movement therebetween, the coupling being comprised of a bearing block receiving a pair of pins, one pin fixed to the carriage, the other fixed to the drive member of the ball screw mechanism with the pins extending transversely to each other and passing into preloaded axial bearing sets carried by the bearing block in a plane normal to the direction of the carriage movement.

8 Claims, 2 Drawing Figures

FIG. 1
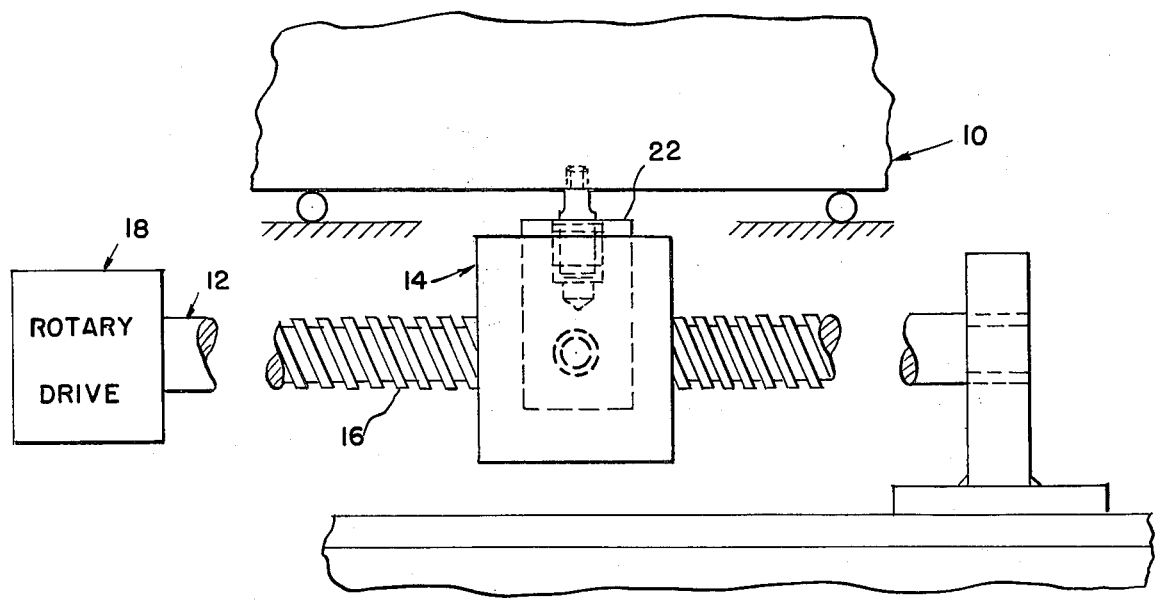
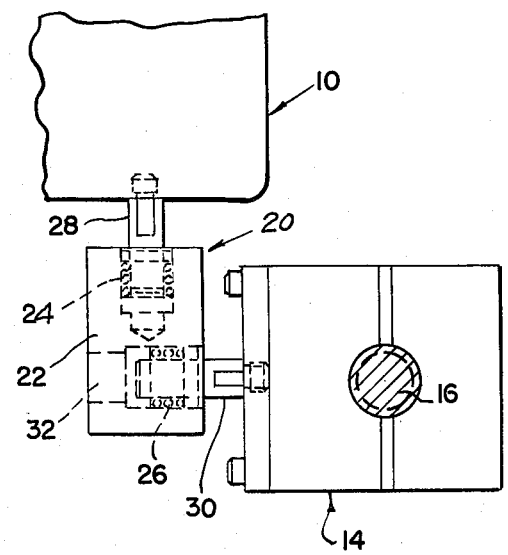
FIG. 2

DRIVE COUPLING

BACKGROUND OF THE INVENTION

1. Field of the Invention

This invention concerns drive couplings, and more particularly, drive couplings for connecting rotary drive members with a driven carriage.

2. Description of the Prior Art

Drive mechanisms for linearly movable carriage members such as are used in computer or numerically controlled coordinate measuring machines or machine tools often have required couplings between a rotary drive such as a ball-screw mechanism and the carriage member. These couplings must allow for lateral relative movement between the carriage and the ball screw nut as the carriage is traversed due to deflections and misalignments in order to eliminate any resulting bending loads, and yet be absolutely rigid to relative displacements along the line of movement of the carriage so that the precise correspondence between the carriage and the nut member is maintained in the interests of accuracy. In the case of such a rotary drive member such as the ball screw nut, rotation of the nut about its axis must also be prevented since this would result in a slight advance or retardation of the relative position of the carriage and nut impairing the aforementioned desired correspondence.

It would be desirable, of course, if these requirements could be met without complex and expensive parts.

One prior art approach has utilized ball and groove cross-slides which allow XY motion in a plane normal to the direction of movement while preventing rotation in this plane, but the parts required are complex and costly, and precision alignment of some of these parts is required.

Another approach has utilized couplings having parts which are rigid in one direction but compliant in another (such as blade shapes), with a plurality of those members arranged in an assemblage as to produce the characteristics described. However, such directional rigidity is in practice impossible to achieve perfectly, and usually some undesired deflections and loadings result. Critical alignments are usually also required in these designs.

Accordingly, it is an object to provide such a coupling which is simple and relatively low in cost and easily assembled without critical positional adjustments or tolerances.

SUMMARY OF THE INVENTION

These objects and others which will become apparent from a reading of the following specification and claims are accomplished by a coupling consisting of a bearing block receiving pins fixed to the respective coupled members and extending into preloaded axial bearings carried by the bearing block. The pins are arranged in a crossing pattern forming a plane normal to the direction of movement of the mechanism to provide a rigid connection therebetween in the direction of movement and preventing relative rotation therebetween, while allowing relative movement in lateral directions.

BRIEF DESCRIPTION OF THE DRAWINGS

FIG. 1 is a front elevational view of a drive coupling arrangement according to the present invention.

FIG. 2 is a side elevational view of the drive coupling arrangement of FIG. 1.

DETAILED DESCRIPTION

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

Referring to the drawings, portions of a carriage member 10 and a ball screw mechanism 12 including a rotary drive mechanism are depicted in diagrammatic form. The carriage 10 is supported for linear rolling movement as depicted diagrammatically in a direction parallel to the axis of the ball screw mechanism 12. This mechanism is adapted to displace the carriage 10 along its direction of movement by virtue of a connection with the ball screw nut member 14 when the ball screw shaft element 16 is rotated by a rotary drive means 18.

The drive coupling 20 according to the present invention constitutes the improved connection between the ball screw nut 14 and the carriage 10, and includes a bearing block member 22.

A pair of drive pins 28 and 30 affixed respectively to the carriage 10 and the ball screw nut 14 are drivingly connected to the bearing block member 22 by means of a sliding connection provided by preloaded axial bearings 24 and 26 carried by the bearing block member 22 into which the drive pins 28 and 30 extend.

These drive pins 28 and 30 extend transversely to each other, i.e., orthogonally, in a common plane normal to the direction of movement of the carriage 10.

Thus, it can be seen that due to the relative rigidity of the pins 28 and 30 to bending, and their tight fit with the preloaded axial bearings 24 and 26 relative movement is prevented between the ball screw nut 14 and the carriage 10 in any direction other than the direction in which the pins 28 and 30 extend into the preloaded bearings 24 and 26 and in particular rigidity is provided along the direction of movement. Furthermore, relative rotation of the ball screw nut and the carriage is prevented to produce precise correspondence of linear movement between the ball screw nut 14 and the carriage 10.

At the same time lateral relative movement is accommodated in a quite frictionless manner by movement of the pins 28 and 30 in and out of the preloaded axial bearings 24 and 26.

It is noted that assembly of the device is also rendered more expeditious by the capability of the pins 28 and 30 to move axially and rotate with the bearings, and to this end, a through clearance hole 32 is provided to allow insertion of pin 30 therethrough.

It can be seen that this drive coupling utilizes simple parts which are easily manufactured and assembled, yet produces very effective control of the various relative motions.

What is claimed is:

1. A drive coupling for connecting a first and a second member comprising:

a bearing block member;

a first drive member connected to said first member;

a second drive member connected to said second member;

said first and second drive members drivingly connected to said bearing block member by means of a sliding connection therebetween, whereby said first and second members are rigidly connected against relative movement in all directions except in the direction in which said drive members slidingly connected to said bearing block member.

2. The drive coupling of claim 1 wherein said first and second drive members comprise pins and wherein said pins extend into preloaded axial bearings carried by said bearing block member to provide said sliding connection.

3. The drive coupling of claim 1 wherein said first and second drive members extend normally to each other and are disposed in a common plane, whereby relative rotation of said first and second members in said plane is prevented.

4. The drive coupling of claim 2 wherein said pins extend normally to each other and are disposed in a common plane, whereby relative rotation of said members in said plane is prevented.

5. In an arrangement wherein a rotary drive mechanism is adapted to linearly advance a carriage member by a rotary drive member coupled to said carriage and advanced by rotation of an element of said rotary drive mechanism, the improvement comprising:
a bearing block member;
a first drive member connected to said rotary drive member;
a second drive member connected to said carriage member;
said first drive member and said second member extending into said bearing block member with a sliding fit therebetween, whereby said rotary drive and carriage members are rigidly connected against relative movement in all directions except in the direction in which said rotary drive members extend into said bearing block member.

6. The arrangement of claim 5 wherein said first and second drive members comprise pins and wherein said pins extend into preloaded axial bearings carried by said bearing block member.

7. The arrangement of claim 5 wherein said first and second drive members extend normally to each other and are disposed in a common plane, whereby relative rotation of said rotary drive and carriage members in said plane is prevented.

8. The arrangement of claim 6 wherein said pins extend normally to each other and are disposed in a common plane, whereby relative rotation of said members in said plane is prevented.

* * * * *